US008888170B2

(12) United States Patent
McCuller et al.

(10) Patent No.: US 8,888,170 B2
(45) Date of Patent: Nov. 18, 2014

(54) HOOD REAR SUSPENSION SYSTEM

(71) Applicants: Troy R. McCuller, Corinth, TX (US); Scott David Hite, Pilot Point, TX (US)

(72) Inventors: Troy R. McCuller, Corinth, TX (US); Scott David Hite, Pilot Point, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 13/787,239

(22) Filed: Mar. 6, 2013

(65) Prior Publication Data

US 2014/0252806 A1    Sep. 11, 2014

(51) Int. Cl.
*B60R 21/34* (2011.01)
*E05F 5/02* (2006.01)

(52) U.S. Cl.
CPC .................................... *E05F 5/022* (2013.01)
USPC .................................................... 296/193.11

(58) Field of Classification Search
CPC ................................ B62D 25/105; E05D 3/06
USPC ........... 296/29, 30, 198, 193.11, 187.03, 191, 296/187.04; 180/69.21; 16/319, 365; 248/220.21, 221.14
See application file for complete search history.

(56) References Cited

U.S. PATENT DOCUMENTS

| | | | | |
|---|---|---|---|---|
| 3,026,131 | A | 3/1962 | Krause | |
| 3,939,986 | A | 2/1976 | Pierro | |
| 4,429,914 | A * | 2/1984 | Bez et al. | 296/187.03 |
| 4,991,675 | A * | 2/1991 | Tosconi et al. | 180/69.21 |
| 5,791,428 | A | 8/1998 | Noll | |
| 6,487,754 | B1 * | 12/2002 | Keen | 16/306 |
| 6,543,086 | B2 * | 4/2003 | Bjureblad et al. | 16/222 |
| 6,695,396 | B1 * | 2/2004 | Schwab | 296/203.02 |
| 6,910,545 | B2 * | 6/2005 | Haun | 180/69.2 |
| 6,948,769 | B2 | 9/2005 | Borkowski | |
| 7,374,233 | B2 * | 5/2008 | Li et al. | 296/203.02 |
| 7,520,562 | B2 | 4/2009 | Dragoi | |
| 7,537,272 | B2 * | 5/2009 | Hirata et al. | 296/187.04 |
| 7,552,789 | B2 * | 6/2009 | Gust | 180/69.21 |
| 7,690,722 | B2 * | 4/2010 | Boggess | 296/207 |
| 7,909,125 | B1 * | 3/2011 | Keen | 180/69.21 |
| 8,162,387 | B1 * | 4/2012 | Nydam et al. | 296/193.11 |
| 2008/0185852 | A1 * | 8/2008 | Suzuki et al. | 293/132 |
| 2008/0211242 | A1 * | 9/2008 | Schmidt et al. | 293/155 |
| 2012/0298603 | A1 * | 11/2012 | Kotaki et al. | 211/71.01 |
| 2013/0088042 | A1 * | 4/2013 | Voss et al. | 296/187.04 |

FOREIGN PATENT DOCUMENTS

| | | | |
|---|---|---|---|
| DE | 42 26 437 | A1 | 2/1993 |
| JP | 2009-269448 | A | 11/2009 |

* cited by examiner

*Primary Examiner* — Pinel Romain
(74) *Attorney, Agent, or Firm* — Christensen O'Connor Johnson Kindness PLLC

(57) ABSTRACT

A hood rear suspension system includes a mounting assembly that provides both vertical and lateral support to the hood while also providing easy adjustment of the hood.

15 Claims, 4 Drawing Sheets

HOOD REAR SUSPENSION SYSTEM

BACKGROUND

Hoods generally form a portion of the front section of a vehicle. Typically, theses hoods either pivot rearwardly or forwardly when opened to provide easy access to the engine compartment of the vehicle. In each case, when the hood is in the closed position, portions of the hood, typically at its free end or along its sides, are supported by vehicle along the perimeter of the engine compartment. A latch or similar mechanism can be utilized to maintain the hood in the closed position.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a hood support assembly is provided. The assembly comprises a mounting bracket adapted to be coupled to a vehicle body component. In some embodiments, the mounting bracket includes a slanting section having coupling structure. The assembly also includes an adjustment member that includes a slanting section that cooperates with the slanting section of the mounting bracket and a support surface configured to support a hood of a vehicle. In some embodiments, the slanting section of the adjustment member has coupling structure that interfaces with the coupling structure of the mounting bracket so as to provide movement between the mounting bracket and the adjustment member. The assembly further includes one or more removable fasteners configured to selectively secure the adjustment member to the mounting bracket in two or more positions.

In accordance with another aspect of the present disclosure, within the environment of an engine compartment of a vehicle having a mounting structure, a hood support assembly is provided. The assembly includes a mounting bracket adapted to be coupled to the mounting structure. In some embodiments, the mounting bracket includes a slanting section having coupling structure. The assembly also includes an adjustment member that includes a slanting section that cooperates with the slanting section of the mounting bracket. In some embodiments, the slanting section of the adjustment member has coupling structure that interfaces with the coupling structure of the mounting bracket so as to provide indexed movement between the mounting bracket and the adjustment member. The assembly further includes a cap supported by the adjustment member and having a support surface configured to support a hood of the vehicle and means for selectively securing the adjustment member to the mounting bracket in two or more indexed positions.

In accordance with another aspect of the present disclosure, a front section of the vehicle is provided. The front section includes an engine compartment having a mounting structure, a hood movably associated with the engine compartment, and a mounting bracket coupled to the mounting structure. In some embodiments, the mounting bracket includes an hood facing slanting section having coupling structure. The front section also includes an adjustment member that includes a slanting section that cooperates with the slanting section of the mounting bracket. In some embodiments, the slanting section of the adjustment member has coupling structure that interfaces with the coupling structure of the mounting bracket so as to provide movement between the mounting bracket and the adjustment member. The front section also includes a cap supported by the adjustment member and having a support surface configured to support a hood of the vehicle, wherein the cap includes a vibration dampening material, a coupling device configured to selectively secure the adjustment member to the mounting bracket in two or more positions, and a hood bracket coupled to the hood of the vehicle. In some embodiments, the hood bracket is configured and positioned so as to be selectively supported by the cap when the hood is in a closed position.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. It will be appreciated that embodiments of the present disclosure may employ any combination of features described herein.

The following description sets forth one or more examples of hood rear suspension systems configured to support the aft section of the hood of a vehicle, such as light, medium or heavy duty truck. As will be described in more detail below, embodiments of the hood rear suspension system include a mounting assembly that provides both vertical and lateral support to the hood while also providing easy adjustment of the hood.

Referring now to FIGS. 1-4, there is shown one example of a hood rear suspension system, generally designated 20, in accordance with aspects of the present disclosure. Generally described, the hood rear suspension system 20 is suitable to support the aft section of a forwardly pivoting hood H of a vehicle. Typically, these hoods H are pivotally attached at their forward ends and pivot forwardly to gain access to the engine compartment C. When closed, the aft or rear section of the hood H is supported by one or more of the hood rear suspension systems 20, which can be secured to or otherwise carried by structure of the engine compartment, such as the vehicle's firewall F or the like.

Figure 1:
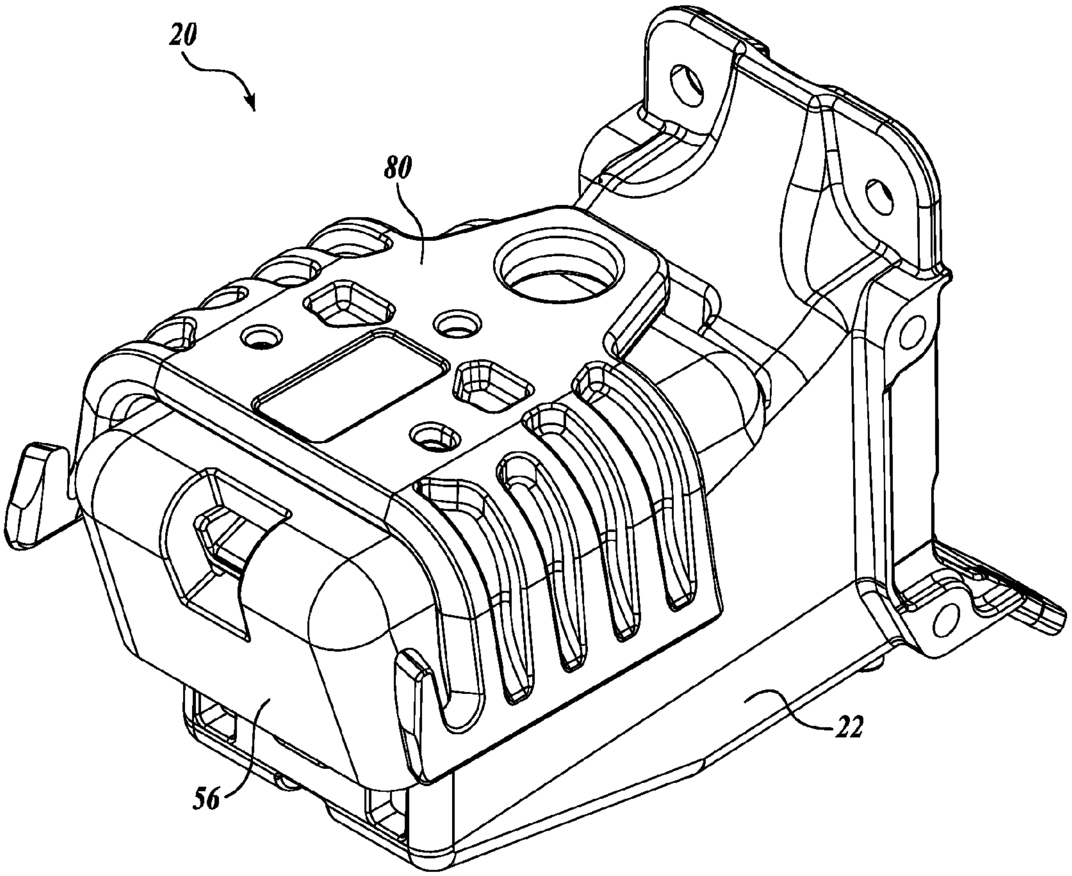
FIG. 1 is a perspective view of one example of a hood rear suspension assembly formed in accordance with aspects of the present disclosure.
Figure 2:
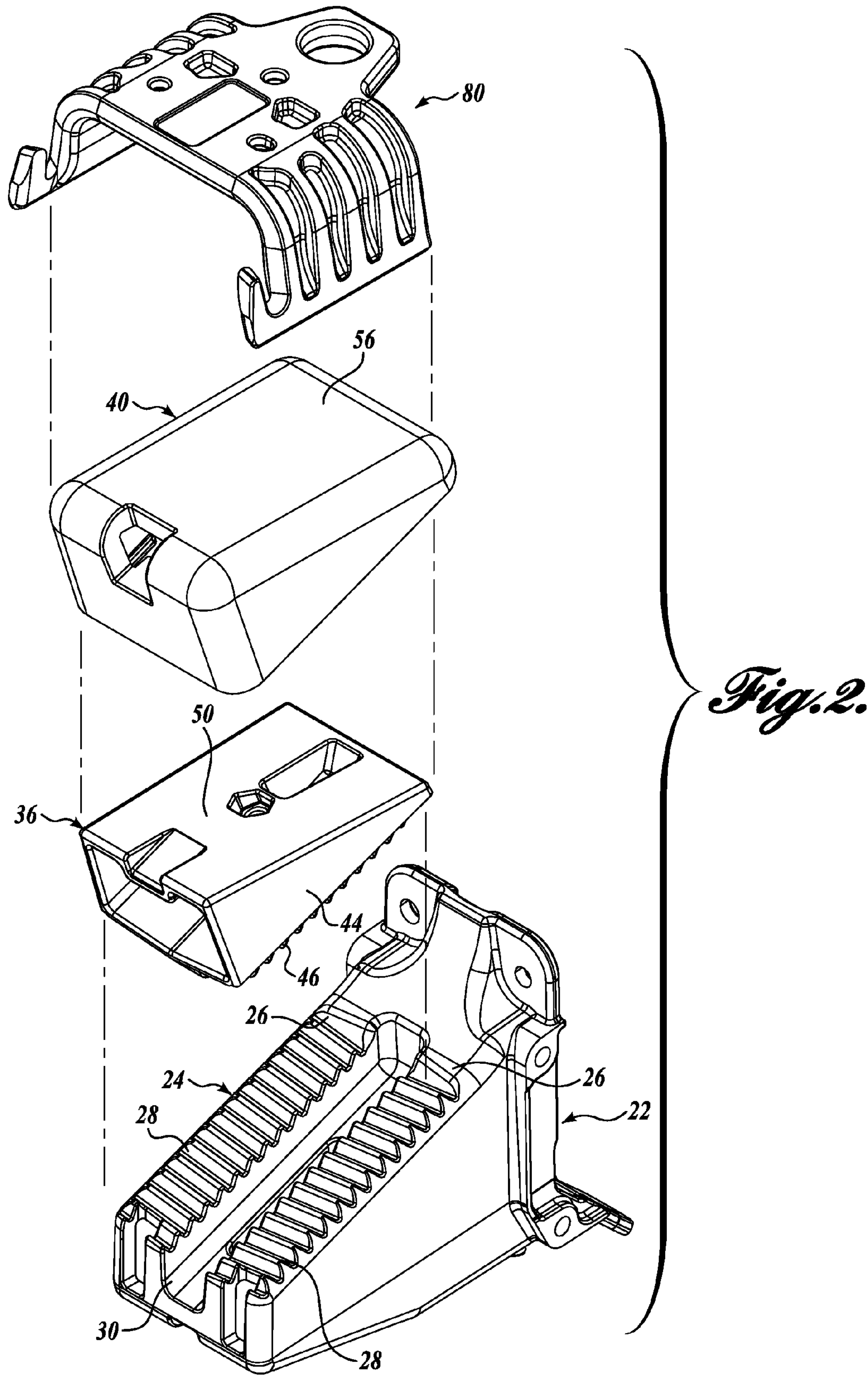
FIG. 2 is an exploded perspective view of the hood rear suspension assembly of FIG. 1.
Figure 3:
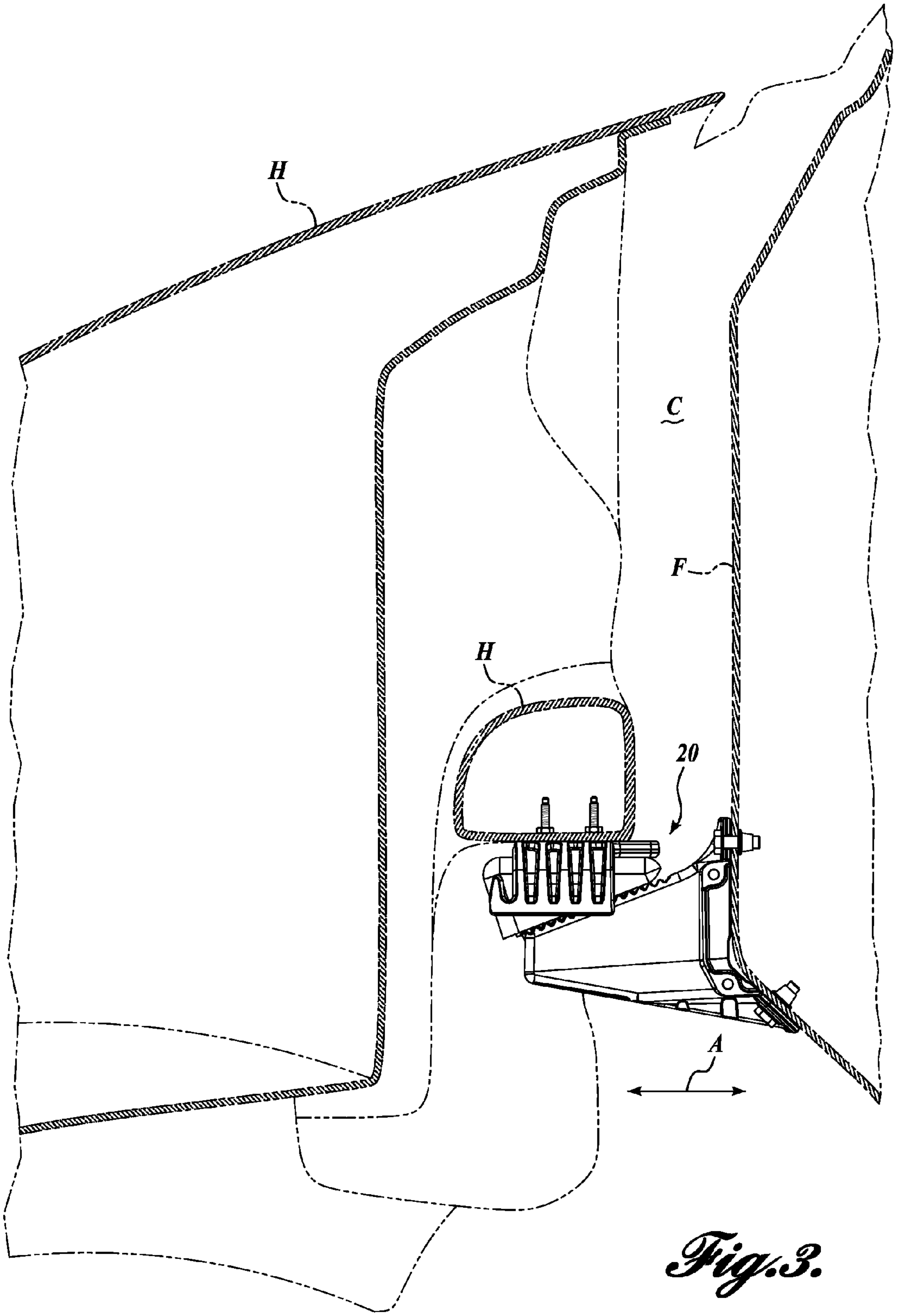
FIG. 3 is an end view of the hood rear suspension assembly of FIG. 1 disposed within the engine compartment of a vehicle, wherein the components of the engine compartment and hood are depicted in cross section.

Turning now to FIGS. 1-3, the components of the hood rear suspension system 20 will now be described in more detail. As best shown in FIGS. 1 and 2, the hood rear suspension system 20 includes a mounting bracket 22 that is configured to be bolted or otherwise securely affixed to a structure of the vehicle, such as the firewall F (See FIGS. 3 and 4). In the embodiment shown in FIG. 2, the mounting bracket 22 includes a channeled, upwardly facing slanting section 24. In this regard, the upwardly facing slanting section 24 includes a support surface 26 that defines two rows of saw teeth 28 spaced apart by a channel 30. In one embodiment, the mounting bracket 22 is constructed out of a non-corrosive metal, although other materials may be suitable, such as thermoplastics, etc.

The hood rear suspension system 20 also includes an adjustment member 36 and an optional cap 40, as best shown in FIG. 2. The adjustment member 36 includes a downwardly facing slanting section 44 that is configured to cooperate with the mounting bracket 22. In that regard, the slanting section 44 defines a set of saw teeth 46 that cooperate with the rows of saw teeth 28. The adjustment member 28 further defines a support surface 50, which directly or indirectly supports the hood of the vehicle when the hood is closed. In one embodiment, the support surface is generally horizontal with respect to a ground surface. It will be appreciated that in other embodiments, the support surface may be disposed at an angle with respect to a horizontal plane. Similar to the mounting bracket 22, the adjustment member 36 may be constructed out of a non-corrosive metal, although other materials may be suitable, such as thermoplastics, etc. The cap 40 is configured to cover the adjustment member 36 in a firm but removable manner. The top 56 of the cap 40, when covering the adjustment member 36, acts as a support surface upon which the vehicle hood or the like can be supported. In some embodiments, the cap may be constructed of a rubber-like material in order to provide vibration damping functionality, among others. It will be appreciated that in some embodiments, the cap 40 can be omitted.

Figure 4:
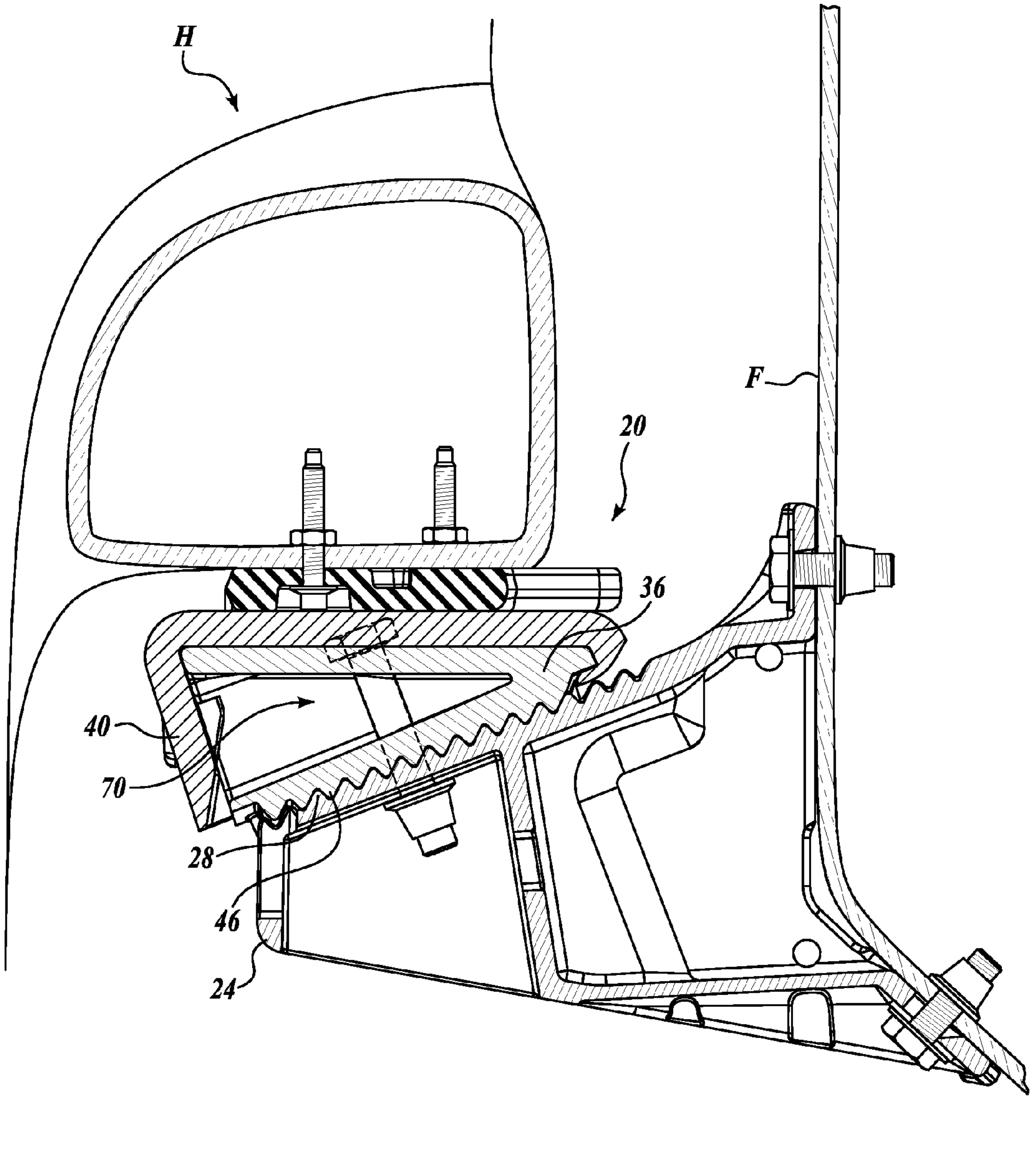
FIG. 4 is a longitudinal cross section view of the hood rear suspension assembly shown in FIG. 3.

When assembled, the adjustment member 36 is adjustably coupled to the mounting bracket 22, as best shown in FIGS. 3 and 4. In that regard, the system may further include a fastener assembly 70 or other means to selectively and adjustably couple the adjustment member 36 to the mounting bracket 22. In one embodiment, the adjustment member 36 and the mounting bracket 22 are configured to receive a bolt/nut combination that is routed through the adjustment member 28 and mounting bracket 22. The bolt/nut combination can be loosened to allow indexed movement of the adjustment member 36 via cooperating teeth 28, 46 and tightened to lock the adjustment member 36 in place with respect to the mounting bracket 22. As such, movement of the adjustment member 36 adjusts the height of the cap 40, and in turn, the support surface that supports the rear of the hood H. Movement of the adjustment member 36 also adjusts the location of the support surface (either the support surface of the cap or the adjustment member) in the longitudinal direction of the vehicle, denoted by the arrow A shown in FIG. 3. It will be appreciated that other removable fasteners or fastening combinations may be utilized to adjustably couple the adjustment member 36 to the mounting bracket 22.

Returning to FIG. 2, the hood rear suspension system 20 further includes a hood bracket 80. The hood bracket 80 is configured to be removably coupled to the hood H (see FIGS. 3 and 4) via any suitable fastening techniques (e.g., treaded bolts/nuts as shown in FIG. 3). The hood bracket 80 is also configured to be selectively coupled to or supported by the cap 40 (when employed) or the adjustment member 36 when the hood H is in the closed position. In one embodiment, the hood bracket 80 is U-shaped. In this and other embodiments, the hood bracket 80 may be constructed out of a material that exhibits appropriate flexing, etc., when the hood bracket is pushed against the cap 40 or the adjustment member 36 in order to provide a friction coupling interface between the hood bracket 80 and the cap 40 or adjustment member 36. In the embodiment shown, the material is a suitable plastic or the like.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A hood support assembly, comprising:

a mounting bracket adapted to be coupled to a vehicle body component, the mounting bracket including a slanting section having coupling structure;

an adjustment member including a slanting section that cooperates with the slanting section of the mounting bracket and a support surface configured to support a hood of a vehicle, the slanting section of the adjustment member having coupling structure that interfaces with the coupling structure of the mounting bracket so as to provide movement between the mounting bracket and the adjustment member; and one or more removable fasteners configured to selectively secure the adjustment member to the mounting bracket in two or more positions, wherein the support surface of the adjustment member is oriented in the same direction in each of the two or more positions.

2. The hood support assembly of claim 1, further comprising a cap supported by the adjustment member.

3. The hood support assembly of claim 2, wherein the cap includes a vibration dampening material.

4. The hood support assembly of claim 2, further comprising:

a hood bracket adapted to be coupled to the hood of the vehicle, wherein the hood bracket is configured to be selectively coupled to the cap when the hood is in a closed position.

5. The hood support assembly of claim 4, wherein the hood bracket is U-shaped.

6. The hood support assembly of claim 1, further comprising:

a hood bracket adapted to be coupled to the hood of the vehicle, wherein the hood bracket is configured to be selectively coupled to the adjustment member when the hood is in a closed position.

7. The hood support assembly of claim 1, wherein the coupling structure of the adjustment member and the coupling structure of the mounting bracket are cooperatingly configured saw teeth.

8. The hood support assembly of claim 1, wherein the two or more positions are indexed positions.

9. In an engine compartment of a vehicle having a mounting structure, a hood support assembly comprising:

a mounting bracket adapted to be coupled to the mounting structure, the mounting bracket including a slanting section having coupling structure;

an adjustment member including a slanting section that cooperates with the slanting section of the mounting bracket, the slanting section of the adjustment member having coupling structure that interfaces with the coupling structure of the mounting bracket so as to provide indexed movement between the mounting bracket and the adjustment member;

a cap supported by the adjustment member and having a support surface configured to support a hood of the vehicle; and means for selectively securing the adjustment member to the mounting bracket in two or more indexed positions, wherein the support surface of the cap is oriented in the same direction in each of the two or more indexed positions.

10. The hood support assembly of claim 9, wherein the cap includes a vibration dampening material.

11. The hood support assembly of claim 9, further comprising:

a hood bracket adapted to be coupled to the hood of the vehicle, wherein the hood bracket is configured to be selectively coupled to the adjustment member when the hood is in a closed position.

12. The hood support assembly of claim 9, wherein the mounting structure is a firewall.

13. A front section of a vehicle, comprising:

an engine compartment having a mounting structure;

a hood movably associated with the engine compartment;

a mounting bracket coupled to the mounting structure, the mounting bracket including an hood facing slanting section having coupling structure;

an adjustment member including a slanting section that cooperates with the slanting section of the mounting bracket, the slanting section of the adjustment member having coupling structure that interfaces with the coupling structure of the mounting bracket so as to provide movement between the mounting bracket and the adjustment member;

a cap supported by the adjustment member and having a support surface configured to support the hood of the vehicle, wherein the cap includes a vibration dampening material; and a coupling device configured to selectively secure the adjustment member to the mounting bracket in two or more positions, wherein the support surface of the cap is facing the hood in each of the two or more positions;

wherein the hood bracket is coupled to the hood of the vehicle, wherein the hood bracket is configured and positioned so as to be selectively supported by the cap when the hood is in a closed position.

14. The front section of claim 13, wherein the mounting structure is a firewall.

15. The front section of claim 13, wherein the two or more positions are indexed positions.

* * * * *